No. 790,414. PATENTED MAY 23, 1905.
G. WINTER & F. EICHBERG.
ALTERNATING CURRENT COMMUTATOR MACHINE.
APPLICATION FILED AUG. 24, 1903.
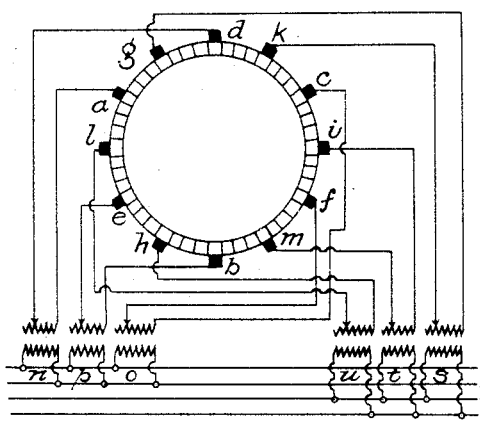
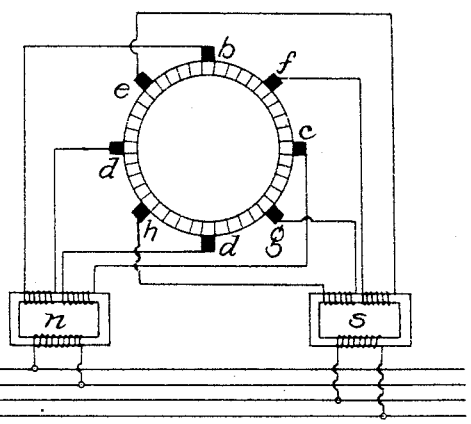
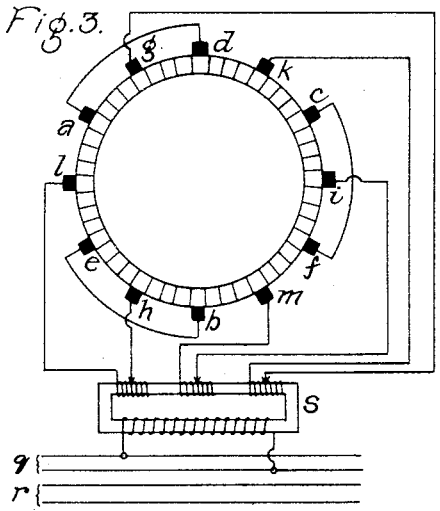
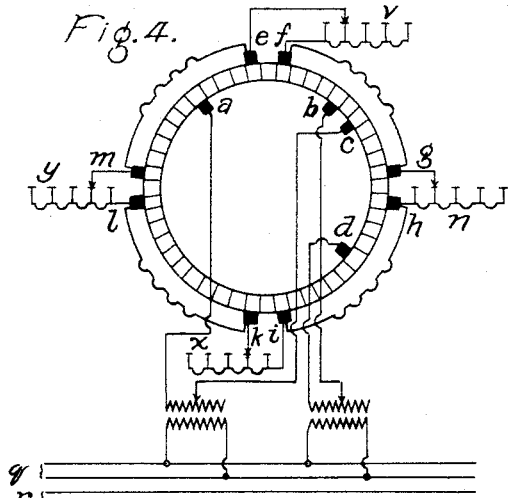
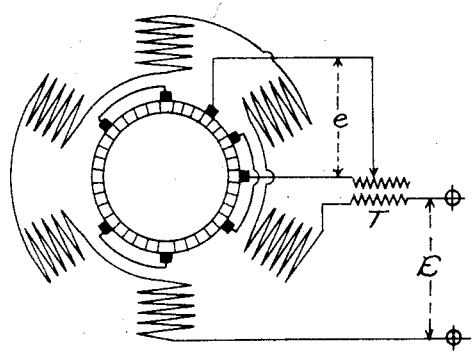
Witnesses:
Inventors:
Gabriel Winter,
Friedrich Eichberg.
by Albert G. Davis
Att'y.

No. 790,414.                                                                                    Patented May 23, 1905.

UNITED STATES PATENT OFFICE.

GABRIEL WINTER, OF VIENNA, AUSTRIA-HUNGARY, AND FRIEDRICH EICHBERG, OF BERLIN, GERMANY, ASSIGNORS TO GENERAL ELECTRIC COMPANY, A CORPORATION OF NEW YORK.

ALTERNATING-CURRENT COMMUTATOR-MACHINE.

SPECIFICATION forming part of Letters Patent No. 790,414, dated May 23, 1905.

Application filed August 24, 1903. Serial No. 170,652.

*To all whom it may concern:*

Be it known that we, GABRIEL WINTER, residing at Vienna, Austria-Hungary, and FRIEDRICH EICHBERG, residing at Berlin, Germany, both subjects of the Emperor of Austria-Hungary, have invented certain new and useful Improvements in Alternating-Current Commutator-Machines, of which the following is a specification.

Our invention relates to alternating-current machines of the commutator type; and its object is to improve the commutation of such machines. In machines of this type, whether single phase or polyphase, it is advantageous to prevent short-circuiting the coils of the armature, since the coils are always subject to a pulsating field which induces heavy currents whenever a coil is short-circuited. The ordinary means employed heretofore for avoiding short-circuiting a coil during commutation consists in employing brushes narrower than one commutator-segment or if $n$ parallel and independent windings are used brushes narrower than $(n-1)$ segments. In a machine having two $p$ poles, in which there are $p$ equipotential brushes distributed around the commutator, it is customary to connect all these equipotential brushes together. This arrangement, which is satisfactory in direct-current machines, gives rise to trouble in alternating-current commutating-machines, since it short-circuits the portion of the armature-winding between each pair of equipotential brushes. In the well-known series winding the portion of the armature-winding between each pair of equipotential brushes consists of a single coil, and since this coil is subject to an alternating field heavy short-circuiting currents will flow.

Our invention consists in a novel arrangement of the commutator-brushes and their connections for multipolar alternating-current machines of the commutator type. In accordance with our invention the equipotential brushes are not directly connected to each other, as in ordinary arrangements; but each brush of one polarity is connected to a single brush of opposite polarity, either through a direct short circuit or through a source of potential, according as the armature-winding is to be short-circuited or supplied with or delivering current. The brushes are thus connected in independent pairs, and short circuits of the armature-winding between equipotential brushes are thereby avoided.

Our invention will best be understood by reference to the accompanying drawings, in which—

Figure 1 shows diagrammatically our invention applied to a six-pole two-phase armature. Fig. 2 shows a modification of the same applied to a four-pole winding. Fig. 3 shows a further modification, in which one phase is supplied with current and the other short-circuited. Fig. 4 shows a further modification, whereby the surface of the commutator is utilized to better advantage; and Fig. 5 shows diagrammatically an arrangement adapted for a six-pole two-phase series winding.

Referring first to Fig. 1, the brushes $a\ d$ are shown connected to the secondary terminals of the transformer $n$. Brushes $c\ f$ are connected to the secondary terminals of the transformer $o$, and the brushes $b\ g$ are connected to the secondary terminals of the transformer $p$. All the primaries of these three transformers are connected to one phase $q$. The remaining brushes $g$, $k$, $i$, $n$, $h$, and $l$ are similarly connected to the secondaries of the transformers $s\ t\ u$, the primaries of which are connected to the other phase, $r$. It will be seen that with this arrangement all the brushes are connected in independent pairs, no electrical connection existing between equipotential brushes, except through the armature-winding. Consequently no short circuits can be produced.

It is of course not necessary that the primary windings of the transformer should be separate. Thus Fig. 2 shows an arrangement in which a single primary supplies two secondaries, to which are connected the two pairs of brushes for one phase of a four-pole two-phase machine.

It is evident that the ratio of transformation of the transformers may be varied as desired, as is indicated in Fig. 1. When all of the secondary winding of the transformer is cut out, the pair of brushes connected thereto is short-circuited. Thus in Fig. 3 the brushes corresponding to one phase are short-circuited, while the brushes corresponding to the other phase are supplied with current. The short-circuited brushes are still maintained in independent pairs, as in the first arrangement.

In order to utilize to greater advantage the surface of the commutator, each brush in the figures heretofore shown may be replaced by two brushes separated by the width of a segment. Such an arrangement is shown in Fig. 4, which shows a two-phase four-pole machine corresponding to Fig. 2. The brushes for one phase are shown inside the commutator. All the brushes for the other phase are shown outside the commutator. It will be seen that these latter brushes comprise four pairs of brushes instead of four brushes, thereby giving twice the bearing-surface of the commutator obtained with the arrangement of Fig. 2. The brushes $e\,f$, which take the place of a single brush, are connected through resistances to the brush $n$ and to the brush $g$, respectively, and since there is the width of a commutator-segment or a little more between the brushes $e\,f$ no short circuit can be produced. It will be seen that the connection of the brushes in independent pairs is still maintained.

The equipotential brushes may be connected to each other, if desired, through variable resistance. Thus the brushes $e\,f$ are shown connected to each other through the variable resistance $v$.

Referring to the brushes inside the commutator in this figure, it will be seen that only a portion of the number heretofore shown are indicated in this drawing. This number and arrangement of brushes is adapted for a series winding. With a parallel winding a greater number of brushes would be used, as in the former figure.

Fig. 5 shows an arrangement for a six-pole machine adapted for use with a series winding. One pair of commutator-brushes is supplied with the potential $e$, derived from the secondary of a series transformer T, the primary of which is in series with the primary winding. Displaced ninety degrees electrically from the first set of brushes is a second set. These are short-circuited on each other in independent pairs, as shown.

Although we have illustrated our invention diagrammatically, it will be understood that it is applicable to any multipolar alternating-current machine of the commutator type in which a plurality of equipotential brushes are distributed around the commutator.

What we claim as new, and desire to secure by Letters Patent of the United States, is—

1. In a multipolar alternating-current machine, a rotor-winding provided with a commutator, two sets of equipotential brushes distributed around the commutator, and conductors connecting each brush of one set with a brush of the other set so as to form a plurality of independently-connected pairs.

2. In a multipolar alternating-current machine, a rotor-winding provided with a commutator, two sets of brushes, the brushes of each set being distributed around the commutator at equipotential points, and the brushes of each set being of a width not greater than that of a commutator-segment, and conductors connecting each brush of one polarity with a brush of the opposite polarity so as to form a plurality of independently-connected pairs.

3. In a multipolar alternating-current machine, a rotor-winding provided with a commutator, two sets of pairs of brushes, the pairs of each set being distributed around the commutator at equipotential points and the brushes of each pair being of a width not greater than that of a commutator-segment and separated from each other by not less than the width of a segment, and conductors connecting each brush of one set with a brush of the other set so as to form a plurality of independently-connected pairs.

4. In a multipolar alternating-current machine, a rotor-winding provided with a commutator, two sets of equipotential brushes distributed around the commutator, conductors connecting each brush of one set with a brush of the other set so as to form a plurality of independently-connected pairs, and means for interconnecting the independently-connected pairs through a variable resistance.

5. In a multipolar alternating-current machine, a rotor-winding provided with a commutator, a plurality of sets of equipotential brushes distributed around the commutator, and conductors connecting one brush of each set with one brush of each other set so as to form a plurality of groups of independently-connected brushes.

In testimony whereof we have hereunto set our hands in presence of two subscribing witnesses.

GABRIEL WINTER.
FRIEDRICH EICHBERG.

Witnesses as to Gabriel Winter:
ALVESTO S. HOGUE,
AUGUST FUGGER.

Witnesses as to Friedrich Eichberg:
HENRY HASPER,
WOLDEMAR HAUPT.